(12) United States Patent
Kilcher et al.

(10) Patent No.: US 10,397,535 B2
(45) Date of Patent: Aug. 27, 2019

(54) OPTICAL MICRO-PROJECTION SYSTEM AND PROJECTION METHOD

(71) Applicant: North Inc., Kitchener (CA)

(72) Inventors: Lucio Kilcher, Montreux (CH); Faouzi Khechana, Crissier (CH)

(73) Assignee: North Inc., Kitchener, ON (CA)

( * ) Notice: Subject to any disclaimer, the term of this patent is extended or adjusted under 35 U.S.C. 154(b) by 0 days.

(21) Appl. No.: 15/911,498

(22) Filed: Mar. 5, 2018

(65) Prior Publication Data

US 2018/0332262 A1 Nov. 15, 2018

Related U.S. Application Data

(63) Continuation of application No. 15/187,691, filed on Jun. 20, 2016, now Pat. No. 9,912,923, which is a
(Continued)

(51) Int. Cl.
| | |
|---|---|
| *G03B 21/14* | (2006.01) |
| *G06F 3/03* | (2006.01) |
| *G06F 3/0354* | (2013.01) |
| *G06T 11/60* | (2006.01) |
| *H04N 9/31* | (2006.01) |
| *G01S 17/10* | (2006.01) |
| *G01S 7/481* | (2006.01) |

(Continued)

(52) U.S. Cl.
CPC ......... *H04N 9/3194* (2013.01); *G01S 7/4814* (2013.01); *G01S 17/102* (2013.01); *G01S 17/42* (2013.01); *G02B 26/0833* (2013.01); *G06F 3/017* (2013.01); *G06F 3/0304* (2013.01); *H04N 9/3129* (2013.01); *H04N 9/3155* (2013.01); *H04N 9/3185* (2013.01); *H04N 9/3188* (2013.01)

(58) Field of Classification Search
CPC .. G03B 21/14; G03B 21/2053; H04N 9/3194; H04N 9/3185; H04N 9/3129; G01S 7/4814; G01S 17/42; G06F 3/0304; G06F 3/017

See application file for complete search history.

(56) References Cited

U.S. PATENT DOCUMENTS

| | | | | |
|---|---|---|---|---|
| 6,934,039 B2 * | 8/2005 | Rincon | ................ | B23K 9/125 356/601 |
| 7,325,933 B2 * | 2/2008 | Kaise | .................... | G03B 21/26 348/E5.137 |

(Continued)

*Primary Examiner* — William C. Dowling
(74) *Attorney, Agent, or Firm* — Thomas Mahon (57) ABSTRACT

An optical micro-projection system comprising the following components: at least one laser light source (200, 400, 402, 600); at least one movable mirror (102, 103, 203) for deviating light from said light source to allow generation of images on a projection surface (104, 301, 303, 306, 603); a self mixing module for measurement of the distance (604) between the projection source and a projection surface, said self mixing module comprising: —at least one photodiode (401, 601) for monitoring the light emission power of the laser light source; —an optical power variation counter for counting optical power variations (605); successive displacements of said mirror allowing the self mixing module providing successive projection distance measurements of a plurality of points of said projection surface. A projection method for optical micro-projection system and a distance measurement method are also provided.

17 Claims, 10 Drawing Sheets

Related U.S. Application Data continuation of application No. 14/681,661, filed on Apr. 8, 2015, now Pat. No. 9,374,566, which is a continuation of application No. 13/358,269, filed on Jan. 25, 2012, now Pat. No. 9,004,698, which is a continuation of application No. PCT/EP2009/059937, filed on Jul. 31, 2009.

(51) Int. Cl.
*G01S 17/42* (2006.01)
*G06F 3/01* (2006.01)
*G02B 26/08* (2006.01)

(56) References Cited

U.S. PATENT DOCUMENTS

| | | | | |
|---|---|---|---|---|
| 8,182,093 B2 * | 5/2012 | Kurozuka | ............ | H04N 9/3129 |
| | | | | 353/37 |
| 9,028,072 B2 * | 5/2015 | Chang | ................ | G03B 21/2053 |
| | | | | 348/744 |
| 9,172,931 B2 * | 10/2015 | Hasegawa | ............ | H04N 9/3194 |

* cited by examiner

Fig. 12 ent functions have been developed. Micro-projections systems are among these devices. With the growing demand for laser diode for various applications such as telecom and laser pointer device, the eye safety issue for human became an issue and was mainly handled by different methods. The simplest method was to use stickers placed at the tip of the laser pointer device and warning the user to avoid any direct eye illumination with the laser. Another method was to develop a specific driving electronics in order to avoid any peak current in the laser diode if electrical failure occurs or to completely switch off the current in the laser diode above a certain current level.

OPTICAL MICRO-PROJECTION SYSTEM AND PROJECTION METHOD

CROSS-REFERENCE TO RELATED APPLICATIONS

This application is a continuation of, claims the benefit of and priority to, previously filed U.S. patent application Ser. No. 15/187,691 filed Jun. 20, 2016 which is a continuation of U.S. patent application Ser. No. 14/681,661 entitled "OPTICAL MICRO-PROJECTION SYSTEM AND PROJECTION METHOD" filed Apr. 8, 2015, which is a continuation of U.S. patent application Ser. No. 13/358,269 filed on Jan. 25, 2012 and subsequently issued as U.S. Pat. No. 9,004,698, which is a continuation of International Patent Application No. PCT/EP2009/059937, filed Jul. 31, 2009. The subject matter of all of the above is hereby incorporated by reference in their entirety.

FIELD OF THE INVENTION

The present invention relates to an optical micro-projection system comprising at least one laser light source and at least one movable mirror, preferably of MEMS type. It also relates to a projection method and a projection distance measurement method.

BACKGROUND OF THE INVENTION

The biological effects of electromagnetic radiation to human beings can be divided into two categories, ionizing and non-ionizing radiation. The first, ionizing radiation, is related to cosmic and x-ray wavelengths and to nuclear radiation. The second, non-ionizing radiation is related to ultraviolet, visible, infrared, microwave, and radio wavelengths. Image and video projection devices works within the visible spectrum of the light, therefore, non-ionizing hazard has to be investigated and avoided while running the device.

Biological effects of non-ionizing radiation are dependent on the spectral region of the radiation (wavelength) and the duration of the exposure to the radiation. Furthermore, the damage to the eyes and skin is dependent on whether there was a single exposure (acute) or daily exposure (chronic) to the radiation.

The eye, are generally considered to be the organ of the body which is most susceptible to damage by radiation. The parts of the eye that can be affected by radiation are the cornea, lens, eye fluid, and retina. Different light radiation affects the individual eye parts. The damage to any of the parts occurs when the light is absorbed by the parts. The damage that takes place is dependent on the ranges of the exposure levels and the time of exposure.

Visible wavelengths of radiated frequency range from 390 nm to 750 nm, those wavelengths are generally refracted by the cornea and absorbed by the retina.

The Maximum Permissible Exposure (MPE) of the eye to visible radiations within 400-700 nm wavelengths is about 0.001 W/cm2 for an exposure time of 10 seconds. Therefore a method to prevent damage is needed to maintain an exposure lower than the authorized MPE.

In addition, the eye is also sensitive to other wavelength that can induce severe damage, in the ultraviolet and infrared and therefore for device using such wavelength, a method for preventing damage is also required.

In the past years, many different types of electronic devices using laser units in order to perform one or more technical functions have been developed. Micro-projections systems are among these devices. With the growing demand for laser diode for various applications such as telecom and laser pointer device, the eye safety issue for human became an issue and was mainly handled by different methods. The simplest method was to use stickers placed at the tip of the laser pointer device and warning the user to avoid any direct eye illumination with the laser. Another method was to develop a specific driving electronics in order to avoid any peak current in the laser diode if electrical failure occurs or to completely switch off the current in the laser diode above a certain current level.

More advanced technique where described in past for eye laser safety, using CCD detector coupled with the laser source. The CCD detector detects the motion of an object or a person in its vision field and sends a signal to stop the laser in the case of a movement.

Other technique use motion sensor, such as accelerometers or/and gyroscope, coupled with the projection system and sense motion of the projector itself, and then send a signal to the laser source to either switch off or lower the intensity. Other techniques also have been tested in the past using capacitive sensor where one electrode is placed in the measurement tool and the human body acts as a second electrode. The human presence is then sensed by the created voltage shift between these two electrodes.

A problem of these laser safety techniques, for the specific laser projection application, is that none of these existing techniques are completely efficient, as the existing solutions do not prevent eye damage if the user switches on the projector while he looks directly toward the light source and while not moving. This specific aspect and possible risk damaging the eye, is possibly one of the key stoppers for the use of such laser projector by a large number of people and especially by children. Moreover, most of these techniques are complex and expensive.

Another problem of the existing techniques to prevent eye damage is that the use of a CCD detector or capacitive detection do not allow having a directional sensing and is typically much larger that the field of projection of moving object. The result is that a moving object placed outside the field of projection, and then fully safe in terms of eye safety, will be sensed by the CCD detector and will either stop of lower the projection intensity of the laser. For hand-held application of laser projector, this working behaviour, even though allowing eye safety apparatus is therefore not adapted to normal operation and use. Indeed the user should be able to use the laser projector in a crowed place and should be able to project while maintaining the projector in its hand, and during any motion.

A further problem of the eye safety technique while using laser source, is that the use of a CCD detector or an external motion sensor further increase the complexity of the overall laser-based projection system by adding a different technology to the technology initially used for the projection purpose.

Figure 1A:
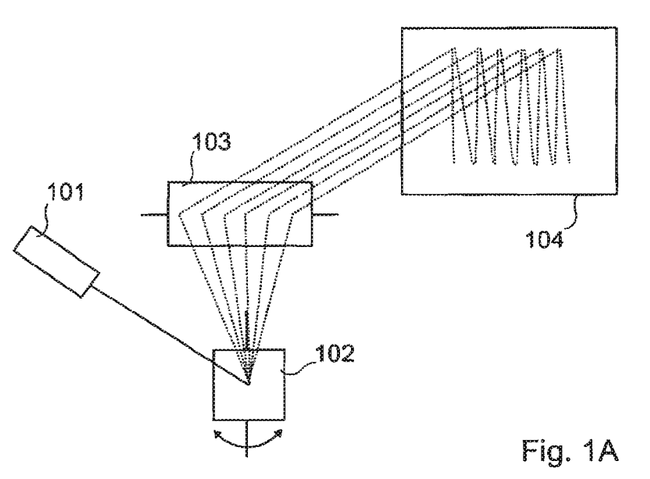
FIGS. 1A and 1B describe known type laser projection systems based respectively on MEMS scanning micro-mirror and matrix of digital micro-mirror or Liquid Crystal on Silicon.
Figure 1B:
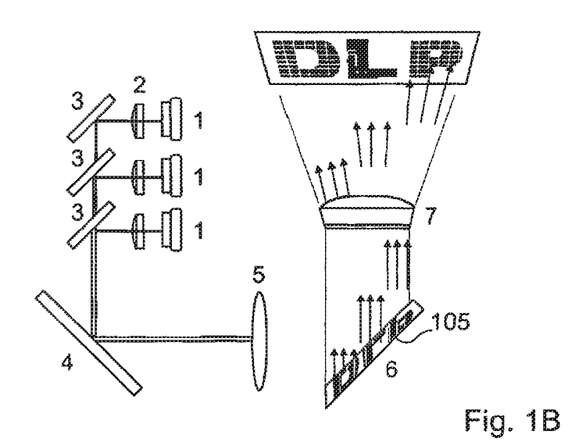

A known type micro-projection systems based on Micro-Electro-Mechanical System (MEMS) is presented in FIG. 1A, where two MEMS scanning mirrors 102 and 103 are reflecting a laser light source 101 is order to project a two dimensional image on a target screen 104. Other projection system, presented in FIG. 1B and based on matrix of a large number of individual addressable pixels 105, either based on either MEMS technology or Liquid Crystal on Silicon could also use laser source to project image.

Figure 2:
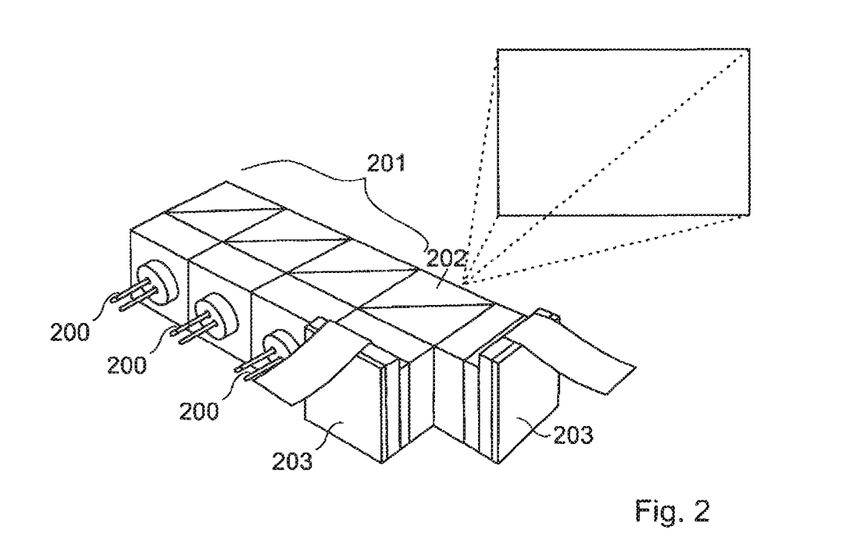
FIG. 2 describes a color projection system based on MEMS scanning micro-mirror and multiple laser sources.

A complete architecture for laser-based colour projection using two One-Degree-Of-Freedom (1 DOF) MEMS scanning mirrors is presented in FIG. 2. The laser beams 200 are combined using a beam combiner 201 optic device and the resulting beam is entering a beam splitter 202 and is deflected by the two MEMS scanning mirror 203 to project a two dimensional image. However, in existing projection systems, there is no complete safety system that can avoid eye damage when the eye is within the field of projection above the MPE limit, as presented in FIG. 3.

Other electronic devices using self-mixing technique are also known. For instance, WO2005/106634 discloses an apparatus for handling sheet material or an optical input device, which employs a relative movement sensor utilizing the so-called "self-mixing" effect of a laser diode. A band pass filter is provided for filtering the electric signal resulting from measurement of the electric signal to reduce or substantially eliminate the effects of both the low frequency carrier signal and the high frequency noise present in such a signal. As a result, the precision of the laser self-mixing translation measurements is significantly improved.

U.S. Pat. No. 6,233,045 relates to a self-mixing sensor usable for remotely measuring speed, vibrations, range, and length provided in a manner making the device practical for economic implementation while retaining accuracy. In one embodiment, the device is configured to avoid mode hopping, such as by providing for relatively high loss for all modes other than the desired mode. Preferably this is accomplished by utilizing laser types that have a high degree of side mode suppression, such as DFB lasers or through active or passive control of the amount of light permitted to re-enter the laser.

However, these devices are of no use to provide micro-projection system or methods.

WO2007/062154 relates to a method for compensating non-uniformities of a projection surface in a front projection display. The measured properties of the surface are used to provide a screen compensation bitmap or a screen compensation convolution table. To obtain the screen compensation map, the method involves measurement of brightness for each pixel and storing the related values in the map. The compensated image is obtained in modifying the grayscale values of the pixels in the video image according to corresponding values in the screen compensation map to produce a compensated video image signal.

According to this method, the applied correction directly depends on the projected image. Thus, if an image showing an irregular surface such as a cushion or non ironed clothes or sheets, etc, is displayed, the projection system will use the method to compensate the image as if the irregularities where caused by the projection surface. Moreover, the correction depends on the image taken by an additional camera or device which is not perfectly aligned with the projection system, which adds to the cost and complexity, and creates parallax errors. This device is of no use for eye-safety.

US2009/0147272 describes a proximity detection method for controlling of an imaging device. A proximity detector is capable of estimating the distance from an object to the projector. If an object is detected within a minimum distance, the projector operation may be altered, for example to cause the projector to turn off or to reduce the intensity of the emitted light below a selected range. In a first embodiment, the detection module uses periphery detection to detect the presence of an object in front of the projector. The proximity detector projects nearly collimated beams of infrared light to create spots that are placed around a display region projected by a projector. The reflected beams are then detected by a linear array of sensors, which detects reflection of the beams within a detection cone. In a second embodiment, a detection module uses triangulation based distance estimation to detect the presence of an object in front of the projector. Such a system involves specific infrared emitters and detectors in addition to the standard projection material. Distance data involve only few points, therefore limiting accuracy and potential other uses of the data. Again, the distance measuring system is not aligned with the projection system, creating parallax errors.

SUMMARY OF THE INVENTION

It is therefore an object of the present invention to provide a method and a device providing protection for human and animal bodies, and more particularly eye protection for humans during use of a laser projection system.

It is another object of the invention to provide protection means for a laser projection system that do not interfere with the surrounding environment or do not provide false detection due to objects that are not directly exposed to laser light.

It is a further objet of the invention to provide a protection for laser projection system that is simple, reliable and cost effective.

It is a further object of the invention to provide a distance measurement method that is compatible for use with a micro projection system.

According to the invention, these aims are achieved by means of an optical micro-projection system comprising the following components:
  at least one light source;
  at least one movable mirror for deviating light from said light source to allow generation of images on a projection surface;
  at least one photodiode for receiving light reflected by said projection surface;
  a distance evaluation circuit for evaluating the distance between the projection source and a projection surface based on light deviated by said mirror and received by said photodiode.

Sharing a common deviation arrangement for illumination and distance measurement is particularly advantageous. For instance, distance measurement for each point or pixel is precisely based on the same path followed by the lighting step, thus avoiding any parallax imprecision.

The distance evaluation system uses similar technology blocks, including a light source, as the ones used for the projection system and therefore does not increase the complexity of the whole system by adding a new different technology.

Distance measurement may be based on different technologies such as time-of-flight evaluation or self-mixing for instance.

The light source is advantageously a laser light source. In a variant, Digital Light Processing (DLP) technologies may be used with such a system.

In a preferred embodiment, the distance evaluation circuit is arranged for evaluating the brightness of light deviated by the mirror and received by the photodiode in order to evaluate the distance.

In an aspect of the invention, the circuit comprises a self-mixing module and an optical power variation counter for counting optical power variations (swings).

In another aspect of the invention, the same component is used as said light source and as said photodiode.

In a further aspect of the invention, the photodiode is an avalanche photodiode, said distance evaluation circuit being arranged for evaluating the time-of-flight of the light between emission by said light source and detection by said avalanche photodiode.

In a further embodiment, the light source emits a modulated light at a visible wavelength, said mirror deviating said visible light so as to scan a visible image onto said projection surface, said photodiode receiving said visible light reflected by said projection surface.

In a still further embodiment, the system further comprises at least one light source emitting a modulated light at a visible wavelength, at least one additional light source emitting infrared light at an infrared wavelength, and said mirror deviating said visible light and said infrared light, so as to scan a visible image onto said projection surface, said photodiode receiving said infrared light reflected by said projection surface.

In a preferred variant, successive displacements of said mirror allow distance measurements of a plurality of points of said projection surface. Compiling the plurality of measured distances then allows generating a projection distance map of the generated points.

The resulting distance map is particularly useful on the one end for enhanced safety, allowing detecting an object at any position, and on the other end to enable further technical features, such as brightness correction, image distortion detection, volume calculation, profile detection, as further discussed here after.

In still another variant, the laser light source is an image projection light source usable alternatively in an image projection mode and in a measuring mode during which the projection point does not correspond to an image pixel.

The mirror is preferably a MEMS scanning micro-mirror.

In another aspect, the self-mixing module further comprises a light amplitude measurement unit for measurement of reflective light amplitude level on said projection surface. This enables the system to compensate for brightness non-uniformity, by projecting brighter image portions in specific zones and darker image portions in other zones.

The optical micro-projection system is advantageously based on Digital Light Processing (DLP) of Liquid Crystal Display (LCD) or Liquid Crystal on Silicon (LCoS) matrix. The light source can also be a Light Emitting Diode (LED) or Super luminescent Light Emitting Diode (SLED).

In another aspect, the invention also provides a projection method for optical micro-projection system comprising the steps of:

a) providing at least one light source coupled to at least one movable micro-mirror for deviating light from said light source to allow generation of images on a projection surface;

b) receiving light reflected by said projection surface with at least one photodiode;

c) with a distance evaluation circuit, evaluating the distance between the projection source and a projection surface based on the output of said photodiode based on light deviated by said micro-mirror and received by said photodiode.

In a preferred embodiment, successive displacements of said mirror allow distance measurements of a plurality of points of said projection surface.

In a further embodiment, the method also comprise the following steps:

a) for a first point (for instance an image pixel) in a projection zone, generating a laser light signal for projection on a projection surface via reflexion on said micro-mirror;

b) measuring the projection distance of this point from the projection source;

c) displacing the micro mirror position to a new position allowing projecting a further point;

d) projecting said further point with said laser light source;

e) measuring the projection distance of this further point from the projection system;

f) repeating steps "c" to "e" until the projection distances for all points have been measured, and;

g) compiling the plurality of measured distances for generating a projection distance map of the generated points.

Self-mixing technique is preferably used for distance measurement. This technique is advantageously completed by optical power variations counted with an optical power variation counter. Other ways of measuring the distance are also possible, such as time-of-flight evaluation for instance.

The light source arrangement differs in accordance with several variants. In a first variant, the light source is also used for image projection. In a second variant, the light source is used alternatively in an image projection mode and in a measuring mode during which the projection point does not correspond to an image pixel. In a third variant, the light source is an infra-red laser diode used specifically for distance measurement.

In a preferred embodiment, the output power from the laser source is reduced if the measured distances indicate that for at least one point, the distance value is below a given threshold value.

Such a method enables for instance the detection of an object placed in front of the micro projector emission light cone and the subsequent reduction of the emitted light power in order to enable safety operation modes. This is of particular interest, for instance in uses related to prevention, such as eye protection and other human and animal body parts safety apparatus. In such cases, the reduced power is preferably set to values such that the Maximum Permissible Exposure (MPE) of the eye is not reached.

The projection method for optical micro-projection system may comprise the step of determining the position of an object placed in the projection cone.

The projection method may comprise the step of determining the profile of said object, and wherein the brightness of the image projected onto said object is reduced.

The projection method, wherein signals representative of the position of said object are used as data commands for a graphical user interface.

The projection method for an optical micro-projection system, wherein said image is projected onto a semi-transparent projection surface, and wherein the position of an object behind said projection surface is determined.

The projection method for optical micro-projection system, wherein the position of several objects simultaneously present in said projection cone is determined.

The projection distance map may also be used for different purposes, in a plurality of applications, in particular, but not exclusively, for micro projection systems.

In a first variant, the projection distance map enables defining the profile of an object or person placed in front of the expected projection surface. After such detection, the map can be used to project around said profile.

In a second variant, the projection distance map is used in order to determine volume dimensions. Considering the high-resolution map obtainable with this method, volumes may be measured in a very accurate, simple and reliable way. For applications such as quality control, where large quantities of components have to be measured accurately and quickly, the present method is of particular interest.

Volume measurements may also be precisely performed with components or objects having complex shapes or profiles.

In a third variant, the projection distance map is used in order to detect any image distortion. In case of such detection, a modulation of the mirror-scanning angle is calculated in order to compensate the image distortion.

In still a further variant, the projection distance map is used in order to adjust the image size and power brightness. This may be done in order to optimize the projection functionality, depending on user preference.

In a further aspect, the invention also provides a distance measurement method, in particular for an optical micro-projection system, comprising the steps of:

a) providing at least one laser light source coupled to a movable micro-mirror and to a scanning control module for deviating light from said light source for projection on a projection surface;

b) receiving light reflected by said projection surface with at least one photodiode;

c) with a measuring circuit using the same scanning control module, evaluating the distance between the projection source and a projection surface based on the output of said photodiode.

In a preferred embodiment, successive displacements of said mirror allow distance measurements of a plurality of points of said projection surface and compiling the plurality of measured distances allow generating a projection distance map of the generated points.

In such a distance measurement method, the projection distance map is advantageously used in order to either determine volume dimensions, or detect any image distortion or to adjust the image size and power brightness.

Self-mixing technique or time-of-flight distance measurement technique may be used for distance measurement.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION OF THE INVENTION

For clarity, as is generally the case in representation of microsystems, the various figures are not drawn to scale.

Figure 4:
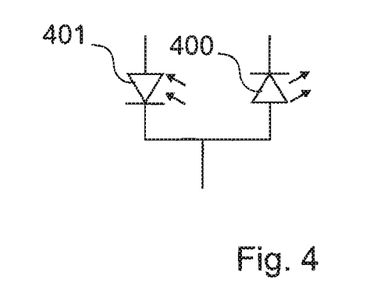
FIG. 4 describes the electrical equivalent circuit of a laser diode.

Laser diodes are made of two discrete components, a laser diode "LD" 400 and a photodiode "PD" 401, as presented in FIG. 4, the first component is used to generate the laser light while the second is used to monitor the light emission power of the laser diode. For many applications the laser diode and the photodiode are feedback looped to maintain the optical output power of the laser diode constant, independently of the working temperature.

Figure 5A:
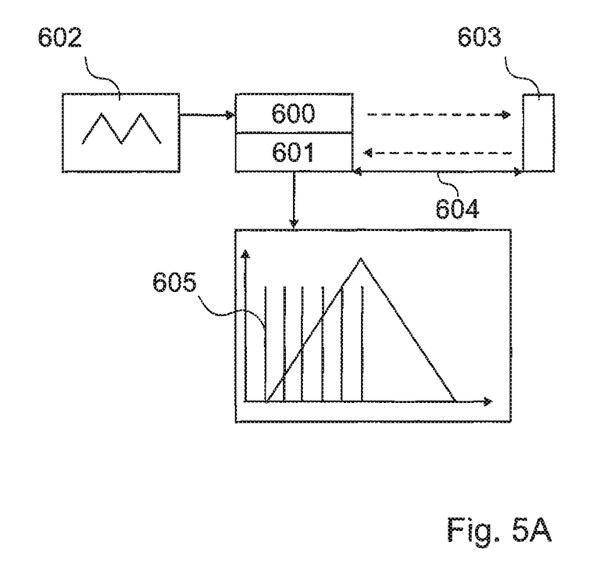
FIG. 5A illustrates the working principle of the distance measurement technique.

A laser diode remote sensing technique described by Thierry Bosch in "An overview of self-mixing sensing applications" can be used to measure displacement, vibration, velocity and distance by using the Optical Feedback Interferometry (OFI) properties inside the active cavity of the laser diode 600 (see FIG. 5).

FIG. 5A presents the Self-Mixing "SM" technique that consists in injecting a triangular waveform modulated current 602 into the laser diode 600 to perform absolute distance 604 measurements of a stationary target 603. Indeed, by modulating the injected current, the length of the equivalent laser diode cavity is modified while the complex refractive index of the active cavity is varying. Moreover, both the optical frequency and power are also modulated. The emitted wavelength $\lambda$ then presents a triangular shift $\Delta\lambda$, therefore the wave number ($2\pi\lambda$) is shifted by the amount ($-2\pi\Delta\lambda/\lambda 2$). Optical power swings occur while injecting the current with a triangular waveform modulation. The absolute distance 604 measurement of a stationary target can be performed by counting the N number of optical power swings 605 during each modulation cycle, detected with the integrated photodiode 601.

In alternative embodiments, absolute distance measurement may be performed by evaluation of time of flight, based for example on avalanche photodiode triggered by single photons and Time to Digital Converter "TDC".

Figure 3:
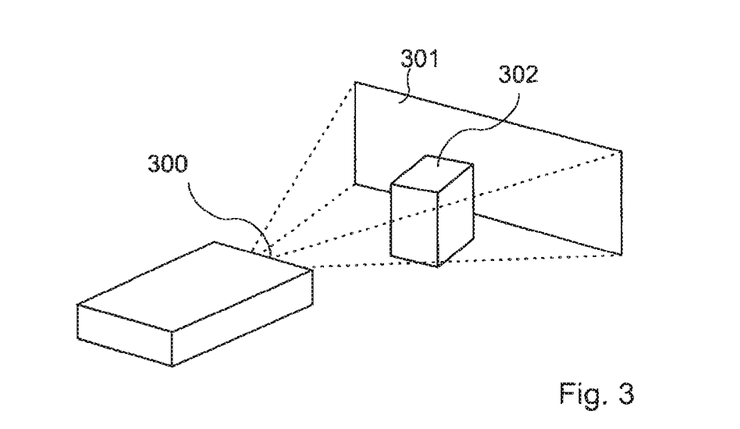
FIG. 3 describes an object in the field of projection of a projector.

Micro-projection systems based on laser diode technology classically use one or two micro mirrors to deflect the light beam and generate the image pixel by pixel. The invention uses the "SM" distance measuring technique coupled with one or two steering mirrors to determine the distance of an object 302 placed in front of the micro-projector light emission cone 300 as shown in FIG. 3. The laser diode used to perform the "SM" distance measurement can be the same one used as light source in the projection system. If needed, an additional laser diode can be added to the projection system, in order to perform the distance measurement without disturbing the projection laser diodes.

Figure 5B:
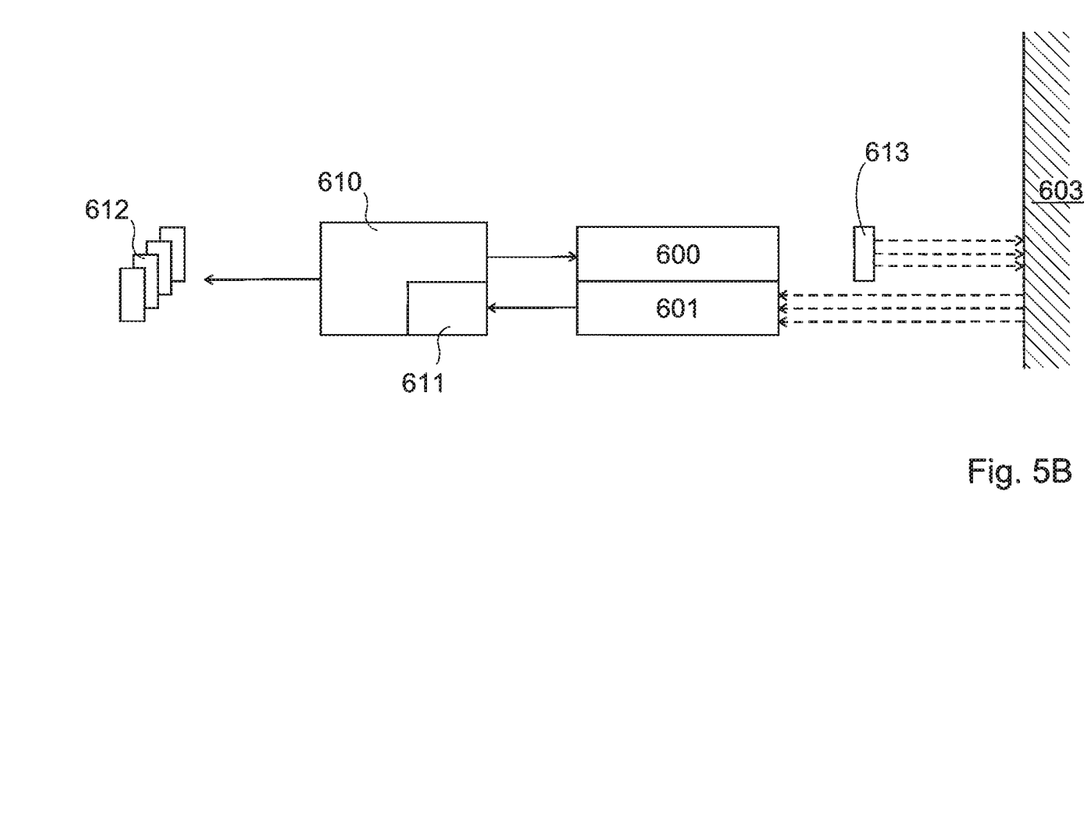
FIG. 5B is a schematic representation of the main components of a micro-projection system according to the invention.
Figure 5C:
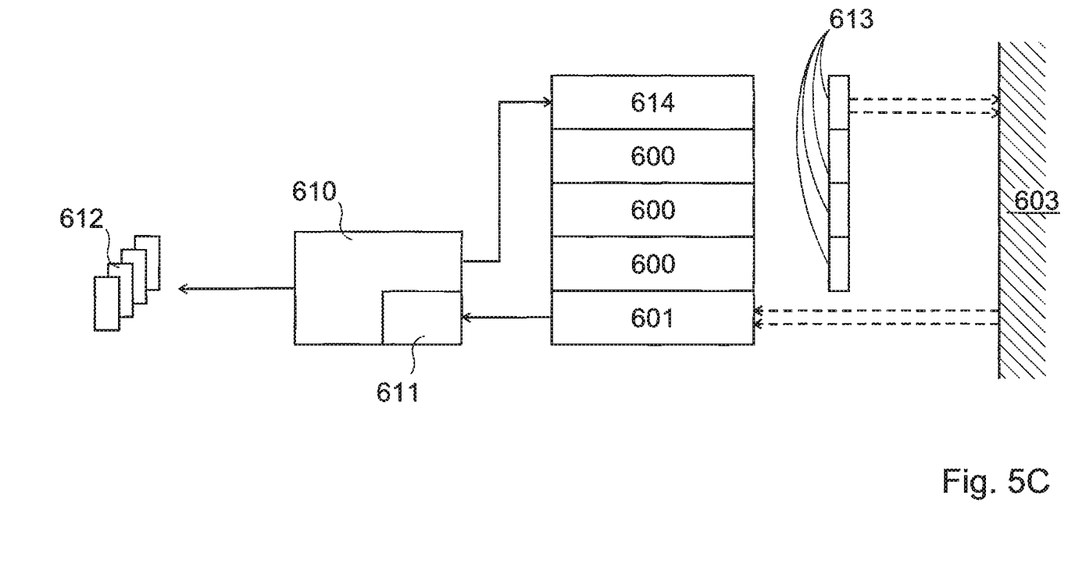
FIG. 5C is a schematic representation of the main components of a variant of a micro-projection system according to the invention.

FIGS. 5B and 5C show schematic representation of the main components involved in the micro-projection system of the invention. As shown in FIG. 5B, a laser diode 600 projects a laser light on a projection surface 603 via a scanning mirror 613. At least a portion of the light is reflected on the projection surface and returns to a photodiode 601, adapted for monitoring the reflected light. A circuit is provided for evaluation of the distance between the projection system and the projection surface. In the illustrated example, this circuit comprises a self-mixing module 610 and an optical power variation counter 611, cooperating with the laser diode 600 and the photodiode 601 and allowing distance measurement using self-mixing technique. The self-mixing module 610 and the optical power variation counter 611, using the multiple distances resulting from the measurement steps, provide projection distance maps 612, that may be used in further steps for different applications as explained hereafter.

Figure 6:
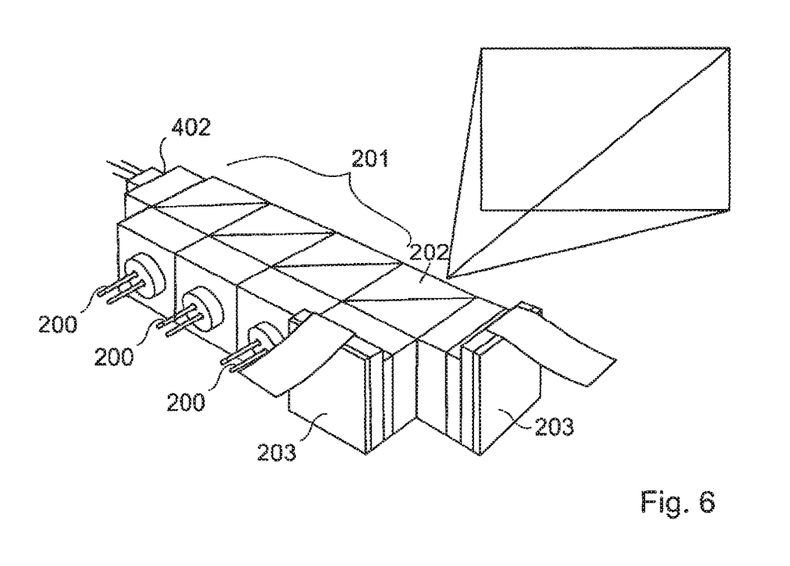
FIG. 6 describes the system architecture for a projector using MEMS scanning micro-mirror and laser light source.

FIG. 5C shows a variant in which at least one Infra-Red IR laser 614 is used. FIG. 6 shows an example of such variant where an additional Infra-Red "IR" laser diode 402 is provided in order to perform the distance measurement. As shown in FIG. 5C, a plurality of laser diodes 600 is advantageously used, coupled or not to one or more IR diodes 614.

The advantage of using an additional IR laser diode, instead of one used as projector light source, is the non disturbance of the projected image while the system perform a distance measurement.

The device and method according to the invention enable performing a distance measurement over the entire projection surface 301. The distance measurement can be performed pixel by pixel while the system is running. As a result of the "SM" distance measurements, an object distance map (or projection distance map) with the same resolution (or with a lower resolution) as the projected image can be generated and used for a plurality of applications. In a first example of application, the projection distance map is used to detect an eventual object placed in front of the micro-projector light emission cone 300. If the detected object is placed too close to the projector emission window 300 the light intensity is automatically reduced, in order to stay under the MPE region, no matter which kind of object is detected.

The method and device of the invention allows completely avoiding the human eye hazard by keeping the projected light intensity lower than the eye damage soil at visible wavelengths. An advantage of the invention consists on the fact that the laser projection system is always safe for the human eye by instantly reducing the output power.

Another aspect of the invention is the innovative way of integrating the "SM" technique into the scanning laser based projection system. Indeed the method and device according to the invention allow minimizing the system complexity and avoid any alignment issues, and insure that the measurement system does not disturb the projection and degrade the image quality.

As shown in FIG. 2, the device of the invention uses one of the laser diode 200 already used as light source for the projection device in relation with the SM technique in the following specific way: during the distance measurement time-frame, no pixel of the image is projected with the laser diode used for the distance measurement. In other words, if one laser diode "lambda" is used to perform the distance measurement, during this time frame, either all other laser diodes are switched OFF, or they are pulsed as usually to project the image pixel, whereas the initial laser diode "lambda" is actuated differently to perform the distance measurement. For a three laser (RGB) projection for example, having the green and blue color still pulsing image pixel as usual could limit the image degradation. In fact, the normal pixel projection way is to pulse the laser using a short pulse. However, in order to use the SM technique, it is required to apply a triangular waveform to the laser. It is therefore not possible to do the measurement distance and the image projection at the same time without degrading the projected image quality. The required time-frame for doing the distance measurement, and therefore the number of image pixel that will not be projected, depends on the normally used pixel pulsation speed.

Similar assembly technique can be used to assemble the IR laser source to the other optical components using passive alignment technique. This technique has the further advantage to perform the distance measurement at the same time as the other lasers are used to project the image, while not disturbing the image projection quality. Furthermore, the IR laser diode can be of lower power compared to the ones used as light sources for the projection system. The lower power can be explained by the higher sensitivity of photodiodes at IR wavelength. The IR laser diode power is always lower than the MPE value for his corresponding wavelength, avoiding any possible eye injuries.

This fact then ensures eye safety from the IR source, always staying under the MPE region and a lower power consumption of the overall projection-distance projection system.

In addition, such optical architecture enables to detect an object only within the cone of projection 300 of the device, meaning only in the range that can be dangerous for the eye. The invention provides directionality of the distance measurement only in the needed scope range because the IR light follows exactly the optical path of the visible light. It then prevents to inadvertently reduce the power intensity if an object is placed outside the projection cone, in a zone that should not be taken into account. The complete expected functionalities of the device are thus maintained.

Figure 7:
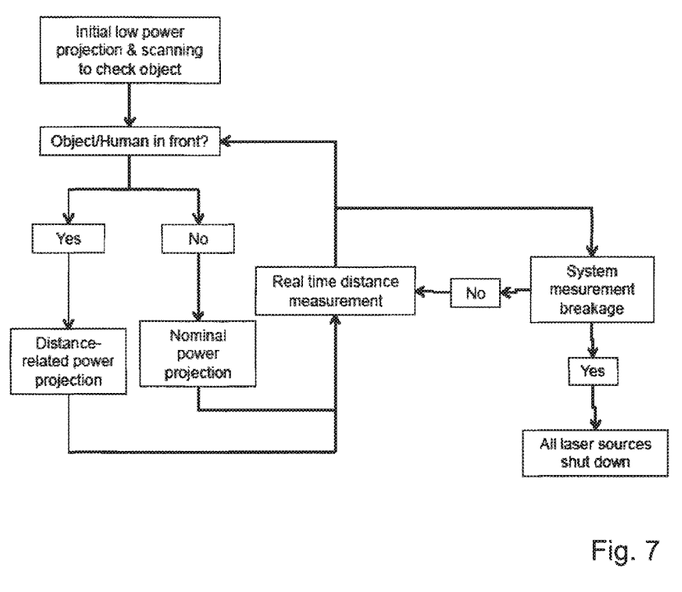
FIG. 7 describes the system block diagram for the laser projector.

FIG. 7 illustrates a further aspect of the invention. The block diagram explains the relation between the distance measurement and the regulated output laser power in order to stay under the MPE region with objects at any distances from the projector light source. In order to avoid any damage during the starting up of the colour projection, in the case a person put the projector in direct contact with the eye for example, a first distance measurement is done with the low power IR laser, under the MPE region. Then if the projection distance is sufficient to maintain lower MPE limit, the visible laser sources are started. As the measurement distance can be done at the same speed or faster than the image pixel pulsation speed, any object of human entering the projection cone can be detected fast enough to stay below the MPE exposure limit. The system is also designed to shut down all laser sources in case of failure of the distance measurement system and/or a failure of one or two MEMS micro mirrors.

Figure 8:
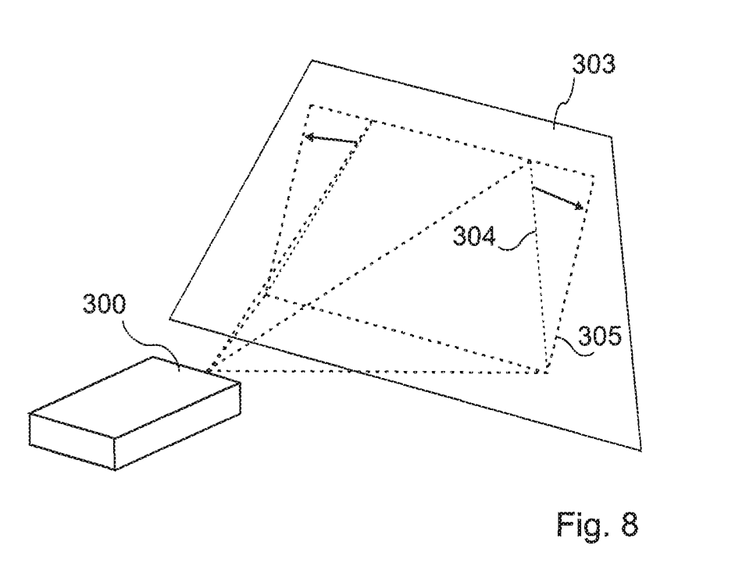
FIG. 8 describes image distortion due to the projection on a non-flat surface.
Figure 9:
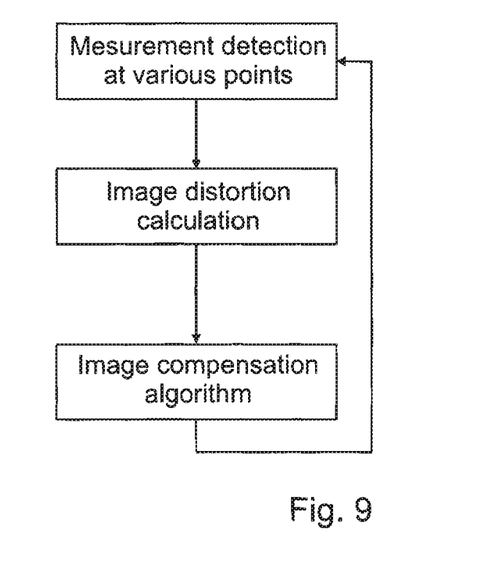
FIG. 9 describes the block diagram for the image distortion compensation.

FIG. 8 illustrates another aspect of the invention related to the use of such integrated measurement system in the projector in order to compensate for the optical projection distortion that arises when the projector projects non-perpendicularly to the projection surface 303. Indeed, using the SM measurement technique, not only the distance from the projector to the projection surface can be measured but also the effective image size and shape on the projection surface. This measurement also gives the information on the parallelism of the image on the projected surface. Therefore, as the width of each scanning line can be measured with the described measurement system, the projection system is provided with a loop control in order to modulate the scanning angle or to alter the scanning pattern in order to compensate for the optical distortion, as presented in the block diagram of FIG. 9. The initial distorted image 304 can then be restored 305 according to the proposed algorithm.

In a further aspect of the invention, the projection distance map is used to measure the distance of any object placed into the projection cone. As the number of measurement points can be very high, a high resolution can be achieved. Because of the use of laser light source, measurement in harsh environment and especially outdoor and long-range measurement can be achieved.

Still a further aspect of the invention relates to the optimization of use of such projection system. Indeed for the user point of view, one of the main concerns is to maximize the brightness of the projector, especially in bright environment, while staying below the MPE region. To do this, the information provided by the measurement distance is used to command the scanning mirror angle and then the projection size is order to maximize the projection brightness. Indeed, as presented in FIG. 10, in the case of a user projecting an image on a non-flat surface 306 that can even have various depth and cavities, the projector brightness is automatically adapted to stay below the MPE region based on the shortest distance between the projector and the projection support. However in this specific case, the projector capabilities and brightness functionality are greatly reduced due to the presence of a small area on which maybe the user would not want to project.

Figure 10:
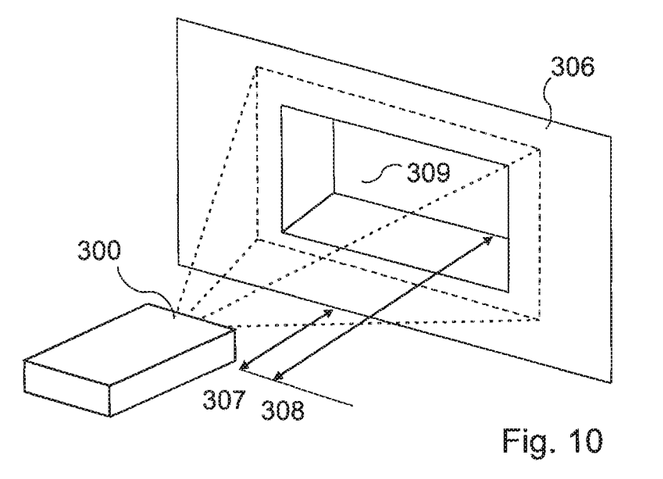
FIG. 10 describes the projection on a surface having various depths.

According to this further aspect of the invention, when the measured distance between the projector and the projection support show variations that can be linear or nearly-linear due to the projection on a curved surface, or that can be abrupt, as seen in FIG. 10, the projector either proposes to the user or performs automatically modulation of projection scanning angle in order to evaluate the optimum projection characteristics on a given surface. In the case presented in FIG. 10, the optimum could be to reduce the projection size to fit into 309 opening and then being able to increase the output power from the projector to achieve a brighter image, which was previously limited by the presence of the 306 surface. This optimum could be different depending on the applications and can be either the brightness or the image size.

Figure 11:
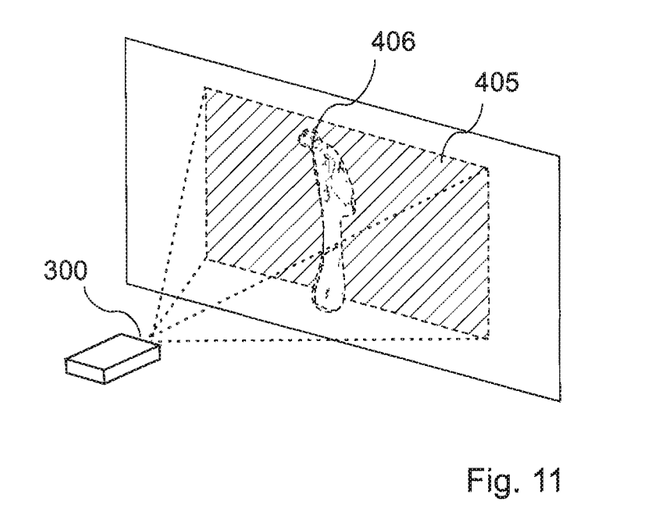
FIG. 11 describes a projection method allowing projecting images around a human body.

In another aspect of the invention, the micro-projection system detects the presence of an object or a human body within the projection field and projects an image all around that object, as presented in FIG. 11. This technical feature enables interactivity, where a person 406 for example can be placed in a "virtual" scene 405 that is projected around him or her.

In a further application, the micro-projection system is adapted to measure the distance between the projector and an object at a high number of points, allowing calculating the volume of the object. The system is then suited for three-dimensional measurement.

Figure 12:
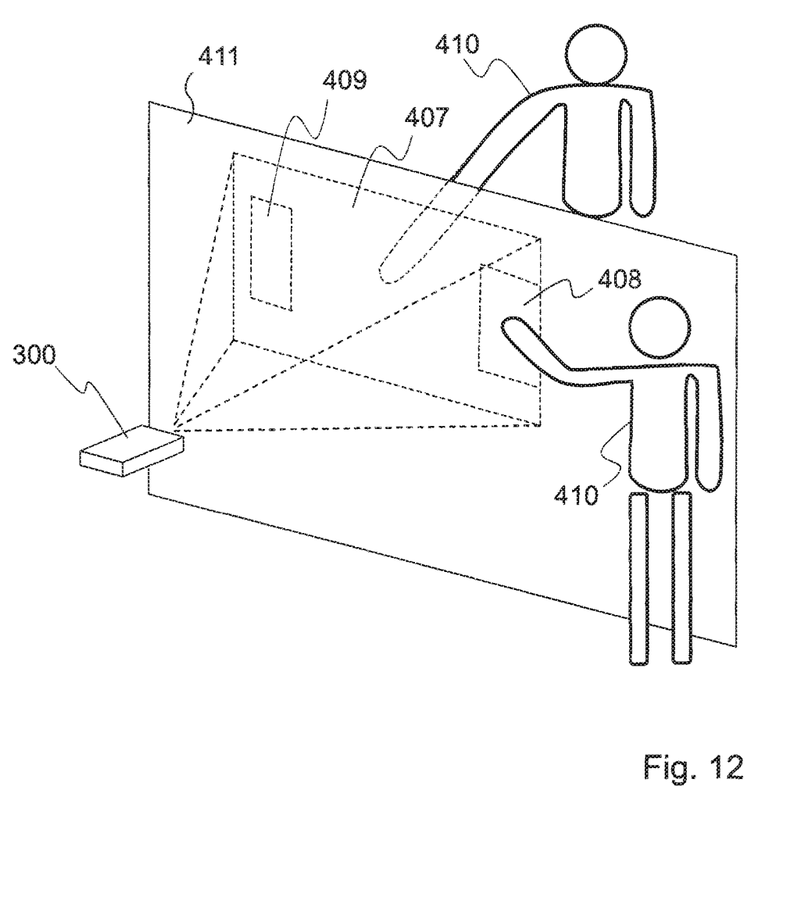
FIG. 12 describes a projection system that interacts with the movement of the human body such as finger or hand.

In a further application of the invention, the system is able to sense in two or even three dimensions the position of a fix or moving object, as shown in FIG. 12, that could be for example a human hand, finger or a stick or even the spot light coming from a laser pointer. This information on position can be retrieved by the processing system that commands the micro-projection system, and used as an additional input channel, for example in order to adapt the projected image according to the position of this object. The motion of such object could also be sensed and the projected image can be changed accordingly. With this system, it is possible to do close to real time evaluation of position and speed of an object, but it is also possible to sense the position and speed of multiple objects simultaneously, for example in order to provide signals representative of the 2D or 3D position of objects within the projection cone, and to command the processing system accordingly.

A typical application of such a system is a human-machine interface to provide interactivity. The projected image 407 could have some specific parts, 408 or 409 for example, that can be dedicated for the object sensing and motion and where the image brightness remains below the MPE region or lower, such as class 1 or class 2, in order to prevent any injury of a person moving in this portion of the image. The rest of the projected image may be brighter. The projected image may also comprise widgets, such as buttons, scrolling elements, sizable windows, etc which can be manipulated by a user for entering commands. Other body and hand gestures may be executed in front of (or behind) the projection surface in order to enter command. For example, a displacement of the arm, or of the fingers, may be used for scrolling, panning, or for moving an object in 3 dimensions. Moving arms apart or together can be used for resizing objects.

The projected image may also be adapted to the position, size and motion of the object, in order to project onto this object, and/or around this object.

In one embodiment, the image is projected onto a semi-transparent screen 411; in this case, an object behind the projection surface, such as a human body 410, could also be sensed.

In any cases, it is not mandatory that the object whose position is sensed is in contact with the projected image screen: an object can also be sensed if it is placed away from the screen.

The system and method of the invention may use either laser visible or infrared source, but all light sources having integrated photodiode can be used, such as Superluminescent Light-Emitting Diodes (SLED) or Light-Emitting Diode (LED) light sources.

Another aspect of the invention is that the system is adapted to have a feedback on both the distance measurement from the projector to the support and the amplitude of the reflected light. This enables the system to determine information about the projection support brightness. Indeed due to the light absorption that depends on the support colour or roughness, the system is able to control the laser power intensity in order to adapt it for the support brightness. As an example, when projecting onto a surface that have bright, grey and dark zones, the projector is able to compensate for the different zones and then give to the user a better visual comfort with uniform or adapted projection brightness.

Those skilled in the art will also understand that the here above described materials can be modified. Such alterations, modifications and improvements are intended to be within the spirit and scope of the invention. For instance, the projection system may be a matrix-based projection system such as LCOS, DLP and LCD.

Accordingly, the foregoing description is by way of example only and is not intended to be limiting.

What is claimed is:

1. A system comprising:
  a photodiode to receive a reflection of a light beam emitted by a light source onto a projection field;
  a processor coupled to the photodiode and the light source; and
  a memory coupled to the processor, the memory comprising instructions that when executed by the processor cause the processor to:
    receive, from the photodiode, an indication of the reflection of the emitted light beam;

detect, based on the reflection, an object proximate to the projection field;
determine a distance between the light source and the object at a plurality of points on the object;
determine a volume of the object based at least in part on the determined distances; and
cause the light source to emit the light beam to project an image around the object.

2. The system of claim 1, the memory comprising instructions that when executed by the processor cause the processor to modify a brightness of a dedicated portion of the image around the object such that the brightness in the dedicated portion is less than a selected level.

3. The system of claim 2, the selected level corresponding to a specified maximum exposure setting for the light source.

4. The system of claim 1, the memory comprising instructions that when executed by the processor cause the processor to:
repeatedly receive, from the photodiode, an indication of the reflection of the emitted light beam; and
detect, based on the repeatedly received indication of the reflection, movement of the object proximate to the projection field.

5. The system of claim 1, the memory comprising instructions that when executed by the processor cause the processor to dynamically modify the projected image based on the detected movement of the object.

6. The system of claim 1, comprising the light source.

7. The system of claim 6, wherein the light source is a light emitting diode.

8. A method comprising:
emitting, via a light source, a light beam onto a projection field;
receiving, via a photodiode, a reflection of the emitted light beam;
detecting, based on the reflection, an object proximate to the projection field;
determining a distance between the light source and the object at a plurality of points on the object;
determining a volume of the object based at least in part on the determined distances; and
projecting, via the light source, the light beam to project an image around the object.

9. The method of claim 8, comprising modifying a brightness of a dedicated portion of the image around the object such that the brightness in the dedicated portion is less than a selected level.

10. The method of claim 9, the selected level corresponding to a specified maximum exposure setting for the light source.

11. The method of claim 8, comprising:
receiving repeatedly, from the photodiode, an indication of the reflection of the emitted light beam; and
detecting, based on the repeatedly received indication of the reflection, movement of the object proximate to the projection field.

12. The method of claim 8, comprising dynamically modifying the projected image based on the detected movement of the object.

13. At least one computer-readable storage medium having stored thereon instructions that, when executed by processing circuitry of a projector, cause the projector to:
emit, via a light source, a light beam onto a projection field;
receive, via a photodiode, a reflection of the emitted light beam;
detect, based on the reflection, an object proximate to the projection field;
determine a distance between the light source and the objet at a plurality of points in the object;
determine a volume of the object based at least in part on the determined distances; and
project, via the light source, the light beam to project an image around the object.

14. The at least one computer-readable storage medium of claim 13, comprising instructions that when executed by the processing circuitry, cause the projector to modify a brightness of a dedicated portion of the image around the object such that the brightness in the dedicated portion is less than a selected level.

15. The at least one computer-readable storage medium of claim 14, the selected level corresponding to a specified maximum exposure setting for the light source.

16. The at least one computer-readable storage medium of claim 13, comprising instructions that when executed by the processing circuitry, cause the projector to:
receive repeatedly, from the photodiode, an indication of the reflection of the emitted light beam; and
detect, based on the repeatedly received indication of the reflection, movement of the object proximate to the projection field.

17. The at least one computer-readable storage medium of claim 13, comprising instructions that when executed by the processing circuitry, cause the projector to dynamically modify the projected image based on the detected movement of the object.

\* \* \* \* \*